(12) United States Patent
Green et al.

(10) Patent No.: US 7,380,144 B2
(45) Date of Patent: May 27, 2008

(54) ENABLING AND DISABLING OF POWERING-OFF OF COMPUTER SYSTEM

(75) Inventors: Alan M. Green, Tomball, TX (US); Jeoff M. Krontz, Tomball, TX (US); Kevin G. Depew, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

(21) Appl. No.: 10/812,486

(22) Filed: Mar. 30, 2004

(65) Prior Publication Data

US 2005/0223245 A1 Oct. 6, 2005

(51) Int. Cl.
*G06F 1/00* (2006.01)
(52) U.S. Cl. .................... 713/310; 713/300
(58) Field of Classification Search ............... 713/310, 713/300
See application file for complete search history.

(56) References Cited

U.S. PATENT DOCUMENTS

| | | | | |
|---|---|---|---|---|
| 5,506,990 A | * | 4/1996 | Holman, Jr. | 713/300 |
| 5,692,057 A | * | 11/1997 | Grad et al. | 381/77 |
| 5,845,136 A | * | 12/1998 | Babcock | 713/300 |
| 6,240,520 B1 | * | 5/2001 | Cha | 713/310 |
| 6,453,169 B1 | * | 9/2002 | Maloney | 455/575.1 |
| 2003/0236936 A1 | * | 12/2003 | Chheda et al. | 710/262 |
| 2005/0050242 A1 | * | 3/2005 | Chen | 710/33 |

OTHER PUBLICATIONS

Intel 82801EB (ICH5) I/O 82801ER (ICH5R), and 82801DB (ICH4) Controller Hub:AC 97 PRM, Programmers Reference Manual (PRM), Apr. 2003, pp. 30-38.

* cited by examiner

*Primary Examiner*—Thomas Lee
*Assistant Examiner*—Ji H. Bae

(57) ABSTRACT

A computer system powers off upon operation of a power switch when the power switch is enabled. A switch mask enables and disables the power switch without intervention by an operating system of the computer system.

22 Claims, 4 Drawing Sheets

ENABLING AND DISABLING OF POWERING-OFF OF COMPUTER SYSTEM

BACKGROUND

In the computer industry, the Advanced Configuration power Interface (ACPI) is an industry standard specification that includes a set of methodologies and tables that allows an operating system (OS) of a computer system to be "abstracted from" the hardware of the computer system. In other words, the ACPI specification describes how the OS can perform certain functions related to hardware, such as powering off or powering down the computer system. For the power-down feature, thus, the OS issues an ACPI-specific message instructing the computer system to shut the power down or to go into a sleep mode.

To take advantage of the ACPI features, an ACPI-compliant computer system 100 must have an ACPI-compliant OS 102 and an ACPI-compliant hardware 104, as illustrated in FIG. 1. ACPI-compliant OSs may adopt some or all of the ACPI features. ACPI-compliant OSs generally include recent versions of many common OSs, such as Windows 2000 and XP™. The ACPI-compliant hardware is generally incorporated in integrated circuits commonly known as "super I/O chips" and "southbridges."

Prior to adoption of the ACPI specification, a power switch directly controlled a power supply to turn on and off electrical power in a computer system. No software was involved in turning on and off the electrical power.

The ACPI-compliant computer system 100 that includes the power-down feature, however, does not allow a power switch 106 to directly control a power supply 108. Instead, when the power switch 106 is toggled on and off while the computer system 100 is on, the power switch generates a "power-off" signal, which causes a System Control Interrupt (SCI) signal to be generated within the computer system 100. An SCI interrupt handler is then invoked within the OS 102. The OS 102 thus begins a "graceful" shutdown in which any open programs are properly closed before electrical power is turned off or reduced. The OS 102 sends an ACPI message to the ACPI hardware 104 to shut down the computer system 100. However, if the OS 102 has stopped responding (i.e. the computer system is "locked up" or has "crashed"), then the OS 102 will not be able to respond to the SCI signal. In this case, for an immediate shutdown, a user can hold the power switch 106 on in order to generate the power-off signal continuously for a period of time (about a four-second delay period). When the ACPI hardware 104 receives the power-off signal continuously for the period of time or receives the message from the OS 102 to shut down the computer system 100, then the ACPI hardware 104 causes the power supply 108 to turn off or turn down.

In some ACPI compliant Operating Systems, the user can configure the ACPI power control features of the computer system 100. In particular, the user can set, through the OS 102, whether the SCI signal will be generated upon operating the power switch 106. In other words, the user can disable the power switch 106 against shutdown upon a momentary activation of the power switch 106. In this manner, an accidental operation of the power switch 106 will not inadvertently begin a system shutdown of the computer system 100.

In some situations, the computer system 100 is not supposed to ever be shut down, such as in the case of a mission-critical database server or web server, which must be "always-on" for an enterprise to function. The configuration feature is, therefore, necessary to maintain the always-on status of the computer system 100. It is still possible, though, to shut down the computer by holding the power switch for the delay period, which for a mission-critical server may still be unacceptable. Additionally, non-ACPI-compliant computer systems or ACPI-compliant computer systems that don't support the power switch disable feature, even if they have the ACPI-compliant hardware 104, are vulnerable to being shut down at any time.

SUMMARY

According to a particular embodiment of the present invention, a computer system comprises an operating system, a power switch and a switch mask. Operation of the power switch, when enabled, causes a power-off of the computer system. The switch mask is connected to the power switch to enable and disable the power switch without intervention by the operating system.

DETAILED DESCRIPTION

Figure 1:
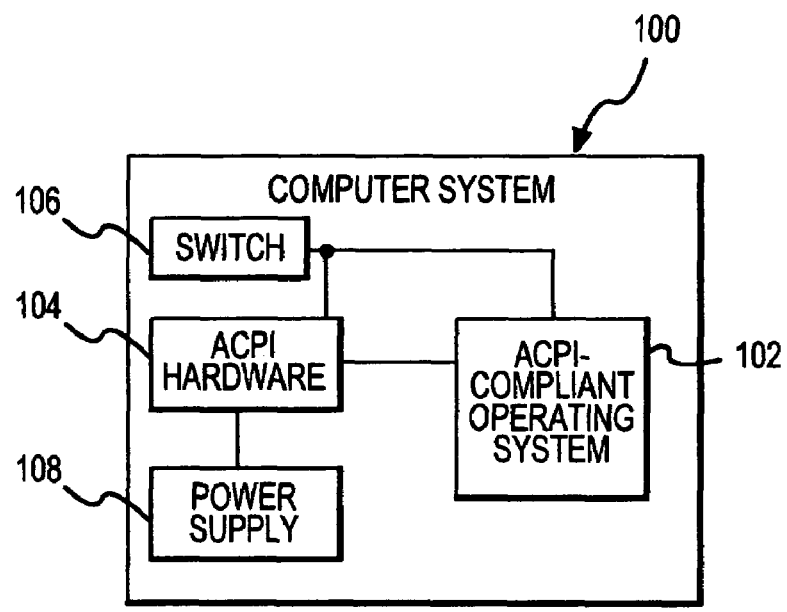
FIG. 1 is a simplified block diagram of a prior art computer system.
Figure 2:
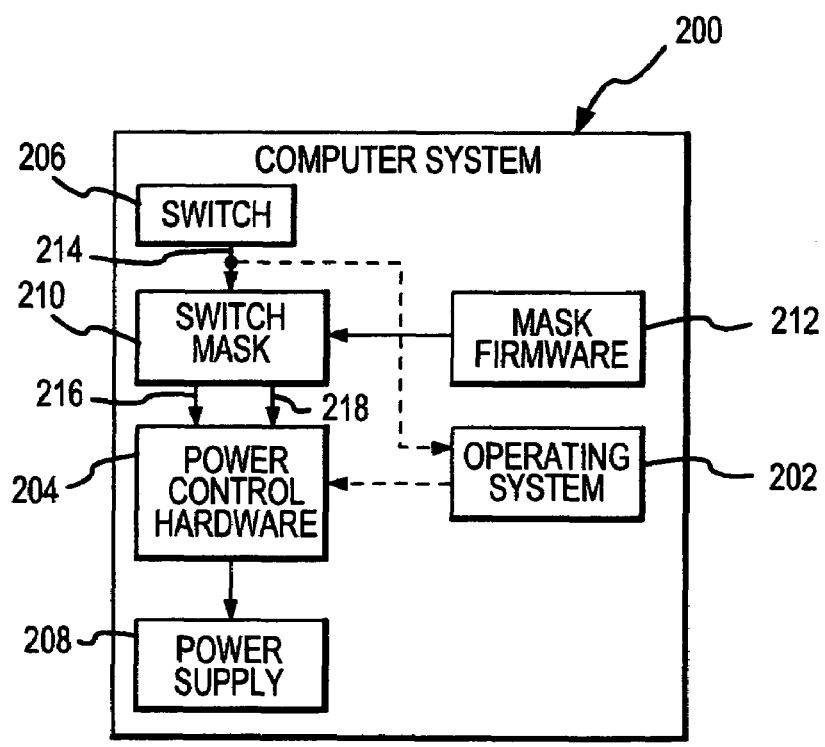
FIG. 2 is a simplified block diagram of a computer system according to an embodiment of the present invention.

A computer system 200 incorporating an embodiment of the present invention is shown in FIG. 2. The computer system 200 generally includes, among other components, an operating system (OS) 202, a power control hardware 204, a power switch 206, a power supply 208, a switch mask 210 and a mask firmware 212. The OS 202 may or may not be ACPI-compliant. Additionally, to be ACPI-compliant, the OS 202 need not adopt all ACPI features, but may implement whichever ACPI features are desired. ACPI-compliant OSs include recent versions of many common OSs, such as Windows 2000 and XP™, among others. Non-ACPI-compliant OSs, on the other hand, generally include older versions of OSs, such as some versions of Linux, Netware 3.x, 4.x, 5.x™ and Windows NT 4.0™. The power control hardware 204 is preferably any appropriate hardware that can control the power supply 208, such as an ACPI-compliant hardware. The power control hardware 204 may be incorporated in an ASIC (Application Specific Integrated Circuit) or PAL (Programmable Array Logic) as a standalone integrated circuit (IC). However, according to a particular embodiment, the power control hardware 204 is preferably incorporated in another IC, as in the case of the ACPI-compliant hardware, which is commonly incorporated in a "super I/O chip" or a "southbridge." The PC97317 and the PC87317 Super I/O Plug and Play Compatible Chips with ACPI-Compliant Controller/Extender™ from National Semiconductor Corporation are examples of such ACPI-compliant super I/O chips. Additionally, the ICH5™ chip from Intel Corporation is an example of such an ACPI-compliant southbridge.

The power switch 206 is preferably a push button or toggle switch or any other appropriate switching device. The power supply 208 is preferably any appropriate power supply device for providing electrical power to the components of the computer system 200. The switch mask 210 may be formed in an ASIC, in a PAL or by discrete components or may be incorporated in another appropriate IC. The mask firmware 212 is preferably incorporated in a ROM (Read Only Memory) configuration code of the computer system 200.

The power switch 206 is preferably activated, or operated, by a user. When the computer system 200 is off, the operation of the power switch preferably generates a power-on signal, which causes the computer system 200 to turn on or power-up. On the other hand, when the computer system 200 is on, the operation of the power switch preferably generates a power-off signal 214 (active low in this embodiment). The power-off signal 214 is supplied to the switch mask 210 and optionally to the OS 202. Additionally, the power-off signal 214 is asserted as long as the power switch 206 is activated, e.g. by the user continuously holding a power button pressed.

The switch mask 210 "masks" the power-off signal 214, thereby enabling or disabling various power-off modes that either allow or prevent a power-off of the computer system 200, according to configurations set by the mask firmware 212. According to a particular embodiment, the switch mask 210 preferably generates an immediate power-off signal 216 and/or a delayed power-off signal 218 (i.e. "masked power-off signals") or neither in response to the power-off signal 214, depending on the configuration set. Thus, the configuration preferably masks or unmasks (i.e. disables or enables, respectively) either or both of the immediate power-off signal 216 and the delayed power-off signal 218 for an immediate power-off mode and a delayed power-off mode, respectively.

When the immediate power-off signal 216 is unmasked (i.e. enabled by the switch mask 210) and the power-off signal 214 is asserted, the switch mask 210 supplies the immediate power-off signal 216 (active low in this embodiment) to the power control hardware 204, which causes the power supply 208 to turn off or turn down the electrical power to the computer system 200. This power-down may be a graceful system shutdown if the OS 202 is ACPI-compliant and the power switch 206 has been enabled for shutdown upon a momentary activation of the power switch 206. Additionally, if both the power control hardware 204 and the OS 202 are ACPI-compliant and the OS 202 has disabled the power switch 206 against a shutdown upon a momentary activation of the power switch 206, then a momentary activation of the power switch 206 will not cause the computer system 200 to power-down, but a continuous assertion of the immediate power-off signal 216 for a delay period of time will cause the computer system 200 to power-down. On the other hand, if the immediate power-off signal 216 is masked (i.e. disabled by the switch mask 210) and the power-off signal 214 is asserted, whether momentarily or continuously for the delay period of time, then the switch mask 210 does not supply the immediate power-off signal 216 to the power control hardware 204, so the power supply 208 does not turn off the electrical power to the computer system 200, unless the masking of the power-off signal 214 has been overridden as described below. In this embodiment, in other words, the immediate power-off signal 216 is held high by the switch mask 210, since the immediate power-off signal 216 is active low, so the power control hardware 204 cannot turn off the electrical power.

When the power-off signal 214 is masked, but the delayed power-off signal 218 is enabled, the masking of the power-off signal 214 is effectively overridden. In this case, when the power-off signal 214 is continuously asserted for a delay period of time (e.g. about four seconds), the switch mask 210 supplies the delayed power-off signal 218 to the power control hardware 204, which causes the power supply 208 to turn off the electrical power to the computer system 200. In other words, according to a particular embodiment, when the signals 216 and 218 are masked and the masking is overridden (i.e. the immediate power-off signal 216 is disabled and the delayed power-off signal 218 is enabled) and the power-off signal 214 is asserted, the computer system 200 does not power off or power down, unless the power-off signal 214 is asserted continuously for the delay time period. If the power-off signal 214 is asserted only momentarily, or for less than the delay time period, then the computer system 200 does not power off or down.

Additionally, when the signals 216 and 218 are masked and the masking is not overridden (i.e. the immediate power-off signal 216 and the delayed power-off signal 218 are disabled) and the power-off signal 214 is asserted, the switch mask 210 does not supply either the immediate power-off signal 216 or the delayed power-off signal 218 to the power control hardware 204 regardless of how long the power-off signal 214 is continuously asserted. Thus, the computer system 200 cannot be powered off or down by activating the power switch 206. In this situation, an accidental or unauthorized power-off of the computer system 200 can be prevented.

The ACPI specification, for example, sets forth various levels of "sleep" states for an ACPI-compliant computer system (e.g. from only partially powered down to completely powered off). An ACPI-compliant hardware typically has at least one input that changes a "sleep state machine" within the ACPI-compliant hardware that controls the sleep state. The sleep states activated by the immediate power-off signal 216 and the delayed power-off signal 218 through the power control hardware 204 preferably depend on any requirements for an anticipated application of the computer system 200. Therefore, according to an embodiment of the invention, the switch mask 210 preferably masks the input to the sleep state machine of the ACPI-compliant hardware.

The operation of the switch mask 210 is not dependent on the operation of the OS 202. Thus, the switch mask 210 can perform as described herein regardless of whether the OS 202 is still responding or has locked up. Additionally, the performance of the switch mask 210 does not depend on whether the OS 202 is ACPI-compliant, so the computer system 200 can achieve at least some of the level of functionality of an ACPI-compliant computer system (with respect to the power-off, power-down and power switch disable features) with or without an ACPI-compliant OS that supports the power switch disable. However, the computer system 200 also includes the ability to disable the delayed power-off feature, an ability which is not otherwise available in an ACPI-compliant computer system. Thus, the computer system 200 is particularly useful in mission critical situations in which the computer system 200 is never supposed to shut down, but is also useful in other appropriate situations, including general-computing situations.

Figure 3:
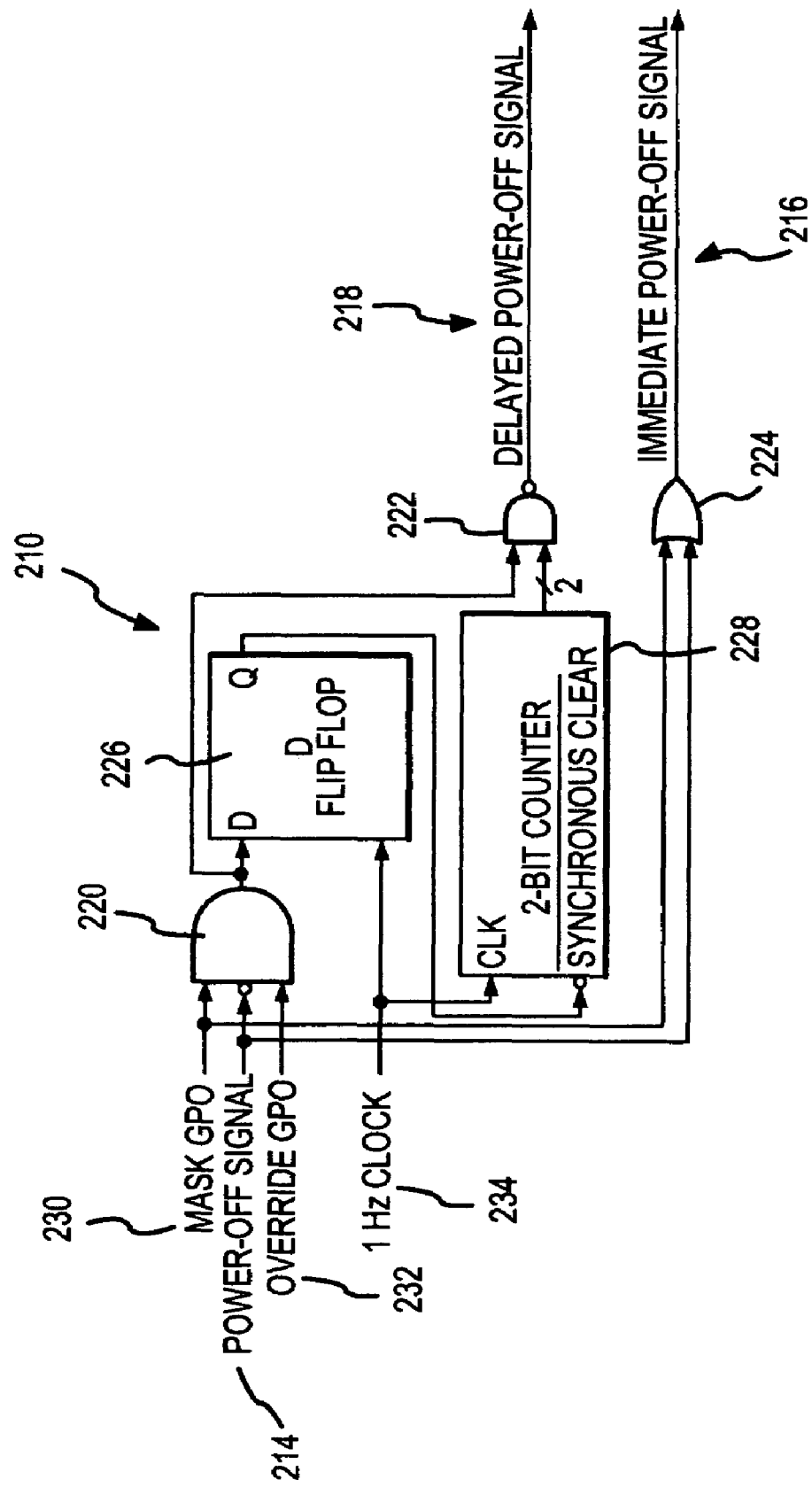
FIG. 3 is a block diagram of a switch mask according to an embodiment of the present invention and incorporated in the computer system shown in FIG. 2.

The switch mask 210, according to the embodiment shown in FIG. 3, generally includes, for example, logic gates 220, 222 and 224, a D flip-flop 226 and a 2-bit counter 228.

Other embodiments may include different circuitry or signals for achieving a similar function and are within the scope of the present invention. The switch mask 210 preferably receives, for example, a mask general purpose output (GPO) 230, an override GPO 232 and a 1-Hz clock signal 234 in addition to the power-off signal 214. The power-off signal 214 is active low in this example. The immediate power-off signal 216 and the delayed power-off signal 218 are also active low in this example. The 2-bit counter 228 and the 1-Hz clock signal 234 are exemplary only. A counter of any appropriate number of bits and a clock signal of any appropriate frequency may be used and are within the scope of the present invention. The mask GPO 230 is generally a signal (active high in this example) to mask and unmask (i.e. disable and enable, respectively) the power-off signal 214, or the signals 216 and 218. The override GPO 232 is generally a signal (active high in this example) to enable and disable the masking override. The mask GPO 230 and the override GPO 232 are set by the mask firmware 212 (FIG. 2) during initial power-on, or boot, of the computer system 200. The mask firmware 212 thus preferably includes a ROM-based or online configuration utility to setup the states for the mask GPO 230 and the override GPO 232 during initial power-on of the computer system 200.

The power-off signal 214 and the mask GPO 230 are supplied to the logic gate 224. When the power-off signal 214 is asserted and the mask GPO 230 is disabled (i.e. the power-off signal 214 is not masked), the logic gate 224 outputs, or asserts, the immediate power-off signal 216 (active low in this embodiment). The immediate power-off signal 216 is supplied, for example, to an input of the power control hardware 204 for controlling the sleep state machine of the power control hardware 204, as in the case of an ACPI-compliant hardware. In this manner, the power control hardware 204 can change the sleep state of the computer system 200 according to either the momentary activation or continuous assertion of the power switch 206, as described above. When the power-off signal 214 is asserted and the mask GPO 230 is enabled (i.e. the power-off signal 214 is masked), the logic gate 224 does not output, or assert, the immediate power-off signal 216. Thus, the switch mask 210 masks the immediate power-off signal 216 for any activation of the power switch 206 (FIG. 2) according to the setting of the mask GPO 230.

The power-off signal 214, the mask GPO 230 and the override GPO 232 are supplied to the logic gate 220. The output of the logic gate 220 is supplied to a D input of the D flip flop 226 and to the logic gate 222. The D flip flop 226 receives the 1-Hz clock signal 234 in addition to the output of the logic gate 220. A Q output of the D flip flop 226 and the 1-Hz clock signal 234 are supplied to the 2-bit counter 228 at a "synchronous clear" input and a clock (CLK) input, respectively. A 2-bit output of the 2-bit counter 228 is supplied to the logic gate 222 in addition to the output of the logic gate 220. The output of the logic gate 222 is the delayed power-off signal 218 (active low in this embodiment). The delayed power-off signal 218 is supplied, for example, to an appropriate input of the power control hardware 204, which causes the computer system 200 to go from "awake" or "on" to "sleep" or "off." According to a particular embodiment, the delayed power-off signal 218 is supplied to a thermal trip input pin of the power control hardware 204, which causes immediate shutdown of the computer system 200.

As long as the synchronous clear input is activated, the 2-bit counter 228 remains "cleared" and does not count. When the synchronous clear input is deactivated, the 2-bit counter 228 counts from 00b to 11b at the speed of the 1-Hz clock signal 234 at the CLK input. The synchronous clear input is deactivated when the output of the logic gate 220 is asserted at the D input of the D flip flop 226 and passed through the D flip flop 226 to the Q output and then to the synchronous clear input. The output of the logic gate 220 is asserted when the power-off signal 214 is asserted, the mask GPO 230 is enabled (i.e. the power-off signal 214 is masked) and the override GPO 232 is enabled (i.e. the masking is overridden).

In this embodiment, both the mask GPO 230 and the override GPO 232 are preferably supplied to the logic gate 220, so the delayed power-off signal 218 can be disabled when the immediate power-off signal 216 is enabled by the mask GPO 230 (i.e. the mask override cannot be enabled when the power-off signal 214 is not masked). Additionally, the delayed power-off signal 218 can be enabled when the immediate power-off signal 216 is disabled by the mask GPO 230 (i.e. the mask override can be enabled when the power-off signal 214 is masked). In this manner, the delayed power-off signal 218 and the immediate power-off signal 216 cannot potentially conflict with each other in causing a shutdown of the computer system 200. Such a potential conflict may occur because a continuous assertion of either the delayed power-off signal 218 or the immediate power-off signal 216 can cause a system shutdown, but in different ways.

As long as the power-off signal 214 is asserted continuously for the delay time period when the mask GPO 230 is enabled and the override GPO 232 is enabled, then the output of the logic gate 220 will be continuously asserted to the D input of the D flip flop, the Q output will be continuously asserted to the synchronous clear input and the 2-bit counter 228 will count to 11b. In the embodiment shown, the count to 11b takes approximately a four-second delay time period. (Other embodiments with different clock rates and counters may have a different delay time period, e.g. 2 to 20 seconds.) When the 2-bit output of the 2-bit counter 228 reaches 11b and if the output of the logic gate 220 is still asserted, then the logic gate 222 will assert the delayed power-off signal 218. If the output of the logic gate 220 is unasserted (e.g. due the power-off signal 214 being unasserted) before the 2-bit output of the 2-bit counter 228 reaches 11b, then the 2-bit counter 228 will stop counting before reaching 11b and the delayed power-off signal 218 will not be asserted. Similarly, if the output of the logic gate 220 is no longer asserted when the 2-bit output of the 2-bit counter 228 reaches 11b, then the delayed power-off signal 218 will not be asserted. Additionally, if either the mask GPO 230 is disabled (i.e. the power-off signal 214 is no longer masked) or the override GPO 232 is disabled (i.e. the override is disabled), then the output of the logic gate 220 will not be asserted upon assertion of the power-off signal 214 and the delayed power-off signal 218 will be prevented from being asserted. Thus, the switch mask 210 masks the power-off signal 214 for any continuous activation (for the delay time period) of the power switch 206 (FIG. 2) according to the settings of the mask GPO 230 and the override GPO 232. In an alternative embodiment, the mask GPO 230 is not supplied to the logic gate 220, so the switch mask 210 masks the power-off signal 214 for any continuous activation of the power switch 206 (FIG. 2) according to the setting of only the override GPO 232.

Figure 4:
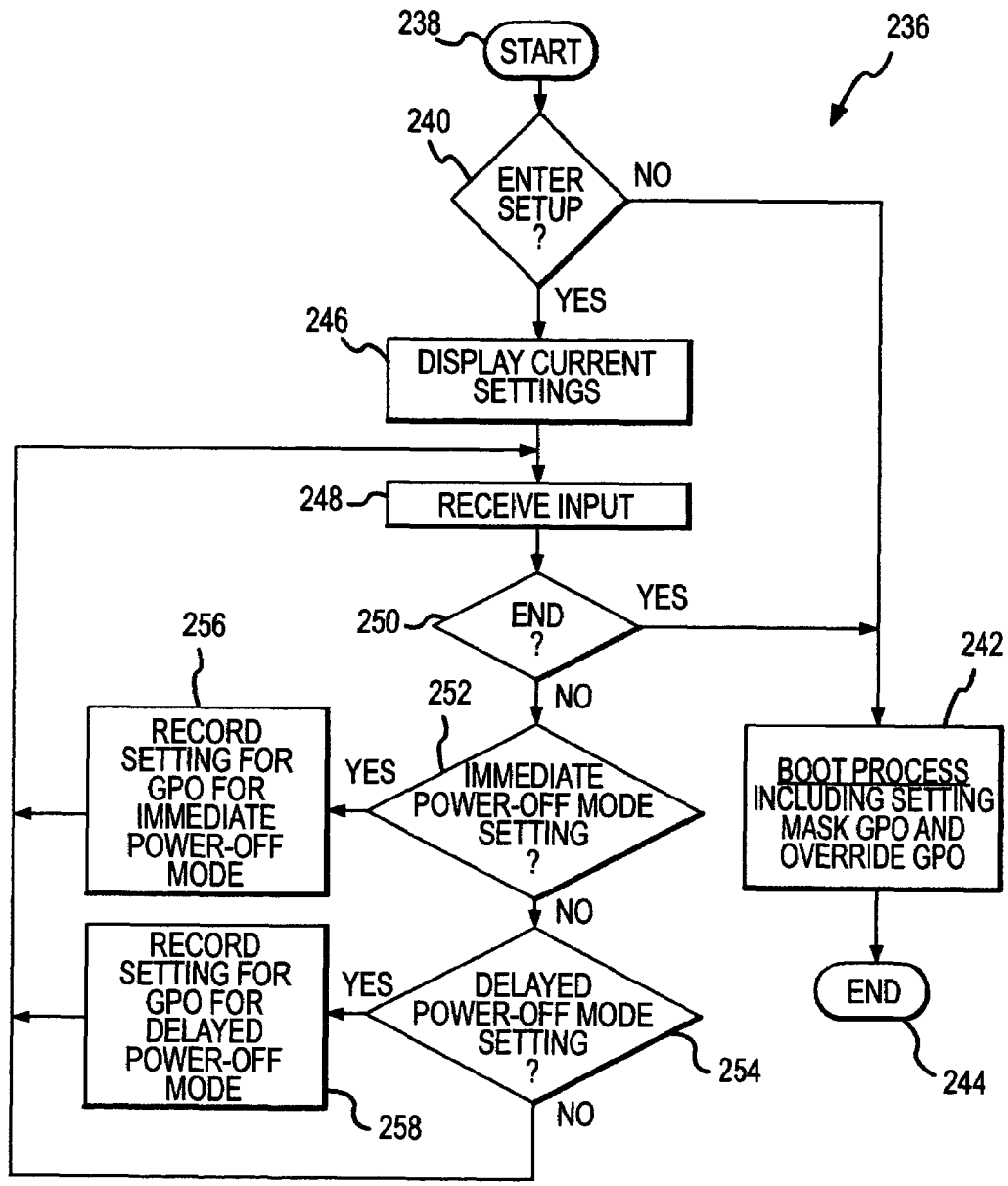
FIG. 4 is a flow chart of an exemplary procedure, according to an embodiment of the present invention, for configuring power-off modes in the computer system shown in FIG. 2.

An exemplary embodiment of a procedure 236 for the mask firmware 212 to configure (i.e. enable or disable) the power-off modes in the computer system 200 is shown in FIG. 4. Upon starting (at 238), preferably at initial power-on of the computer system 200, it is determined (at 240) whether to enter a setup mode. To enter the setup mode, the user typically presses a particular key or set of keys on a keyboard of the computer system 200 early in a boot process after initially turning on or restarting the computer system 200. If setup mode is not entered, as determined at 240, then the boot process continues (at 242), including setting the values for the mask GPO 230 and the override GPO 232 (FIG. 3). The boot process reads the selected settings, or default settings if no selection was made, for the mask GPO 230 and the override GPO 232 and sets the values accordingly. The procedure 236 then ends at 244.

If the setup mode is entered, as determined at 240, the current settings are displayed (at 246) on a display screen for the computer system 200. The user then makes a selection, which is received as input at 248. It is determined (at 250) whether the user's selection is to end the setup mode. If so, then the boot process continues at 242, and so forth as described above. If the user's selection is not to end the setup mode, as determined at 250, then it is determined whether the user's selection (received at 248) is to set the immediate power-off mode or the delayed power-off mode at 252 or 254, respectively. If the user's selection is to set the immediate power-off mode, as determined at 252, then the selected setting is recorded (at 256) for the GPO for the immediate power-off mode (i.e. the mask GPO 230). If the user's selection is to set the delayed power-off mode, as determined at 254, then the selected setting is recorded (at 258) for the GPO for the delayed power-off mode (i.e. the override GPO 232). The user may continue to select or reselect the settings for the immediate power-off mode and/or the delayed power-off mode at 248 through 258 until the user selects to end the setup mode, as determined at 250. The boot process continues at 242, and so forth as described above. Once the settings for the immediate power-off and delayed power-off modes are selected, the computer system 200 preferably sets the GPOs 230 and 232 accordingly on every boot of the computer system 200. The settings are preferably modified only when the user modifies the selections via the setup mode of the mask firmware 212.

Figure 5:
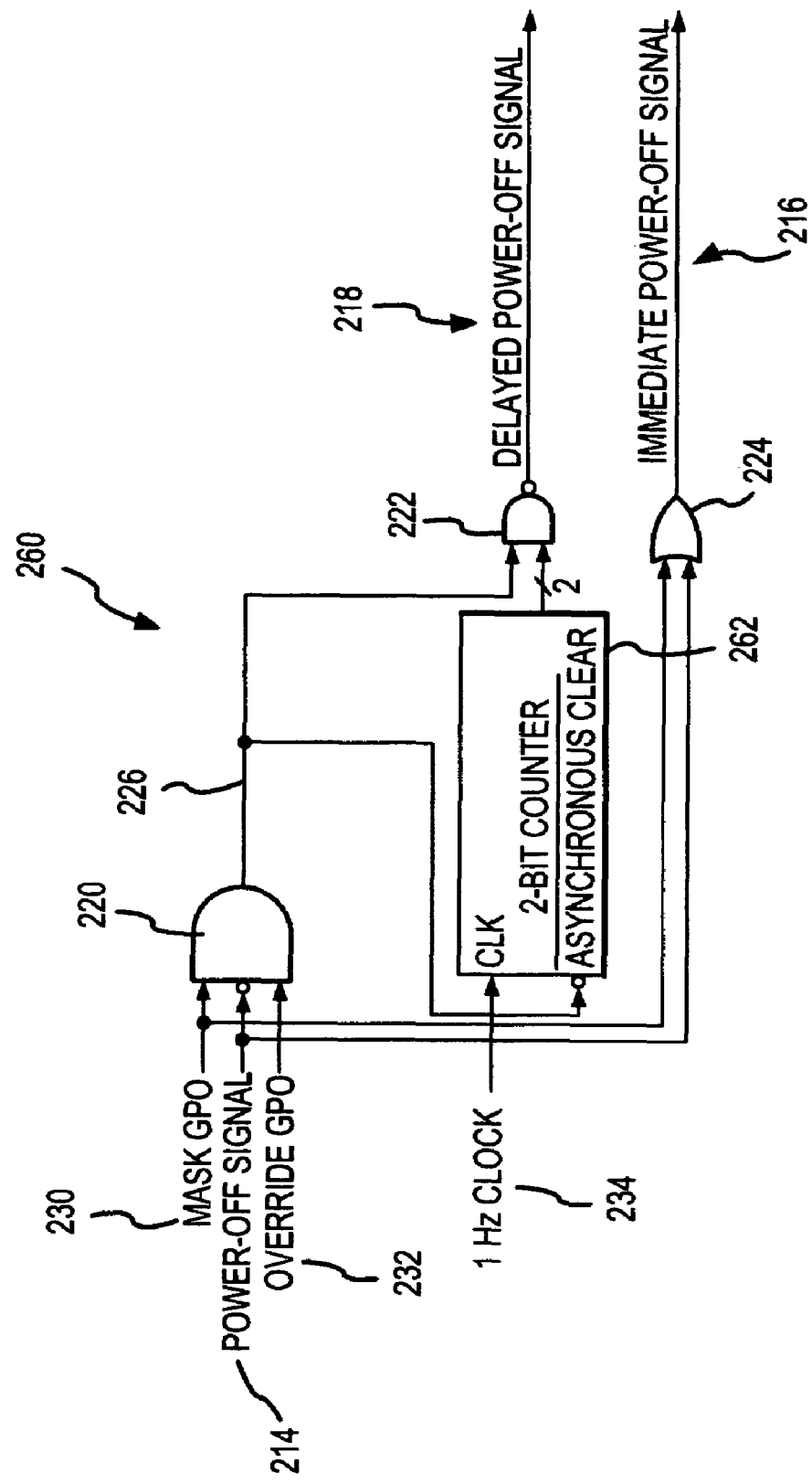
FIG. 5 is a block diagram of a switch mask according to an alternative embodiment of the present invention and incorporated in the computer system shown in FIG. 2.

An alternative embodiment for a switch mask 260 (an alternative to the switch mask 210, FIGS. 2 and 3) is shown in FIG. 5. In this embodiment, the output of the logic gate 220 is supplied to an asynchronous clear input of a 2-bit counter 262, as opposed to the synchronous clear input of the 2-bit counter 228 (FIG. 3). In this manner, if the user lets go of the power switch 206 at any time, the 2-bit counter 262 will be cleared back to zero. According to the embodiment illustrated by the switch mask 210, on the other hand, the counter would clear back to zero only if the user let go of the power switch 206 for more than one second. Therefore, the 2-bit counter 262 is always held in asynchronous reset (output=zero) if either the mask GPO 230 or the override GPO 232 is disabled. If the mask GPO 230 is enabled (i.e. the power-off signal 214 is disabled, or masked) and the override GPO 232 is enabled (i.e. the masking is overridden) and the power-off signal 214 is asserted, then the asynchronous reset is removed, and the 2-bit counter 262 begins to count to four seconds. Thus, If the user holds the power switch 206 for four seconds, the delayed power-off signal 218 will be asserted. If the user lets go of the power switch 206 at any time, the 2-bit counter 262 will be reset back to zero and the user will again have to hold the power switch 206 for four consecutive seconds to assert the delayed power-off signal 218.

We claim:

1. A power switch mask for use in a computer system, comprising:

an input for a power-off signal;
a first output at which a first signal is supplied as long as the power-off signal is received when power-off is enabled, the first signal not being supplied when power-off is disabled, momentary output of the first signal capable of causing a graceful power-down of the computer system, and continuous output of the first signal for a delay time period capable of causing an immediate power-down of the computer system; and
a second output at which a second signal is supplied in response to continuous input of the power-off signal for the delay period of time when power-off is disabled and an override is enabled, the second signal not being supplied when the override is disabled, output of the second signal capable of causing the immediate power-down of the computer system.

2. A power switch mask for use in a computer system, comprising:

a means for generating first signal in response to receiving a power-off signal while receiving a power-off enabled signal, the first signal not being generated in response to receiving the power-off signal while not receiving the power-off enabled signal, momentary generation of the first signal capable of causing a graceful power-down of the computer system, and continuous generation of the first signal for a delay time period capable of causing an immediate power-down of the computer system; and
a means for generating a second signal in response to receiving the power-off signal continuously during the delay time period while receiving an override enabled signal and not receiving the power-off enabled signal, the second signal not being generated in response to receiving the power-off signal while not receiving the override enabled signal, generation of the second signal capable of causing the immediate power-down of the computer system.

3. A method for controlling powering off of a computer system, comprising:

setting a switch mask to one of two power-off modes comprising power-off enabled and power-off disabled;
if power-off is disabled, setting the switch mask to one of two override modes comprising override enabled and override disabled;
generating a power-off signal indicating a desire to power down the computer system;
intercepting the power-off signal by the switch mask;
responding to the power-off signal according to the settings of the switch mask;
when the switch mask is set to power-off enabled, powering down the computer system in response to the power-off signal;
when the switch mask is set to power-off disabled and override disabled, preventing powering down the computer system in response to the power-off signal; and
when the switch mask is set to power-off disabled and override enabled, powering down the computer system in response to the power-off signal.

4. A method as defined in claim 3 further comprising:
responding to the power-off signal according to the settings of the switch mask without intervention by the operating system of the computer system.

5. A method as defined in claim 3, wherein:
when the switch mask is set to power-off disabled and override enabled, the powering down of the computer system is in response to the power-off signal being generating continuously for a delay period of time.

6. A method as defined in claim 3, wherein:
when the switch mask is set to power-off enabled, the powering down of the computer system is caused by supplying a first signal from the switch mask to a power controller;
when the switch mask is set to power-off disabled and override disabled, the preventing of the powering down of the computer system in response to the power-off signal involves preventing the supplying of the first signal to the power controller; and
when the switch mask is set to power-off disabled and override enabled, the powering down of the computer system is caused by supplying a second signal from the switch mask to the power controller.

7. A method as defined in claim 3 wherein:
when the switch mask is set to power-off enabled, a first signal is generated by the switch mask and supplied to a power controller for a duration of the generating of the power-off signal; and
when the switch mask is set to override enabled, a second signal is generated by the switch mask and supplied to the power controller after generating the power-off signal continuously for a delay time period.

8. A method as defined in claim 7, wherein:
the power controller is ACPI-compliant.

9. A method as defined in claim 8, further comprising:
an operating system that is not ACPI-compliant.

10. A method as defined in claim 8 further comprising:
an operating system that is ACPI-compliant.

11. A method for controlling powering off of a computer system, comprising:
generating a power-off signal;
intercepting the power-off signal by a switch mask;
generating a masked power-off signal by the switch mask corresponding to the power-off signal when power-off is enabled in the switch mask;
preventing generation of the masked power-off signal when power-off is disabled in the switch mask:
powering off the computer system in response to the masked power-off signal without intervention by an operating system of the computer system;
generating an override signal by the switch mask when power-off is disabled, an override is enabled and the power-off signal is generated continuously for a delay period of time; and
powering off the computer system in response to the override signal.

12. A computer system comprising:
a switch that generates a power-off signal;
a mask connected to the switch, and which: asserts a first signal in response to the power-off signal when power-off is enabled through the mask, prevents assertion of the first signal when power-off is disabled, and asserts a second signal in response to continuous generation of the power-off signal for a delay period when power-off is disabled and an override is enabled through the mask; and
a power controller connected to the mask, wherein: the first signal asserted momentarily at a first input thereof initiates a graceful power-down of the computer system, the first signal asserted continuously for the delay period initiates an immediate power-down, and the second signal received at a second input initiates the immediate power-down.

13. A computer system as defined in claim 12, further comprising:
an operating system;
and wherein the mask can enable and disable the power-off of the computer system without intervention by the operating system.

14. A computer system as defined in claim 13, wherein:
the operating system is incapable of causing the computer system to power off; and
the mask, when enabling the power-off, causes the computer system to power off in response to operation of the switch.

15. A computer system as defined in claim 14, wherein:
the operating system is incapable of operating the power controller to cause the computer system to power off; and
the mask, when enabling the power-off, is capable of causing the power controller to cause the computer system to power off in response to operation of the switch.

16. A computer system as defined in claim 15, wherein:
the power controller comprises an ACPI-compliant hardware; and
the operating system comprises a non-ACPI-compliant operating system.

17. A computer system as defined in claim 13, wherein:
the operating system is capable of causing the computer system to power off upon operation of the switch; and
the mask, when disabling the power-off, prevents the power-off of the computer system.

18. A computer system as defined in claim 17, wherein:
the operating system is capable of operating the power controller to cause the computer system to power off upon operation of the switch; and
the mask, when disabling the power-off, prevents the power controller from powering off the computer system.

19. A computer system as defined in claim 18, wherein:
the power controller comprises an ACPI-compliant hardware; and
the operating system comprises an ACPI-compliant operating system.

20. A computer system comprising:
a means for generating a power-off signal;
a means, connected to the generating means, for asserting a first signal in response to the power-off signal when power-off is enabled, for preventing assertion of the first signal when power-off is disabled, and for asserting a second signal in response to continuous generation of the power-off signal for a delay period when power-off is disabled and an override is enabled; and
a means, connected to the asserting means, for initiating a graceful power-down of the computer system when the first signal is asserted momentarily at a first input thereof, for initiating an immediate power-down when the first signal is asserted continuously for the delay period, and for initiating the immediate power-down when the second signal is received at a second input.

21. A computer system as defined in claim 20 further comprising:
an operating system means;
and wherein the asserting, independent of the operating system means, can enable and disable the power-down of the computer system.

22. A computer system as defined in claim 21, wherein:
the powering off means is ACPI-compliant.

* * * * *

UNITED STATES PATENT AND TRADEMARK OFFICE
CERTIFICATE OF CORRECTION

| | | |
|---|---|---|
| PATENT NO. | : 7,380,144 B2 | Page 1 of 1 |
| APPLICATION NO. | : 10/812486 | |
| DATED | : May 27, 2008 | |
| INVENTOR(S) | : Alan M. Green et al. | |

It is certified that error appears in the above-identified patent and that said Letters Patent is hereby corrected as shown below:

In column 2, line 65, delete "ompliant" and insert -- compliant --, therefor.

In column 8, line 59, in Claim 4, after "claim 3" insert -- , --.

In column 9, line 15, in Claim 7, after "claim 3" insert -- , --.

In column 9, line 28, in Claim 10, after "claim 8" insert -- , --.

In column 10, line 57, in Claim 21, after "claim 20" insert -- , --.

In column 10, line 60, in Claim 21, delete "asserting," and insert -- asserting means, --, therefor.

Signed and Sealed this

Third Day of February, 2009

JOHN DOLL
*Acting Director of the United States Patent and Trademark Office*